United States Patent [19]

Stuart et al.

[11] 4,160,288
[45] Jul. 3, 1979

[54] ACTIVE FILTER CIRCUIT FOR REGULATED DC TO DC POWER SUPPLIES

[75] Inventors: Kenneth L. Stuart, Riviera Beach; William E. Baker, Jr., Frederick, both of Md.

[73] Assignee: Communications Satellite Corp., Washington, D.C.

[21] Appl. No.: 906,706

[22] Filed: May 17, 1978

[51] Int. Cl.$^2$ .................... H02M 1/14; H02M 3/335
[52] U.S. Cl. ........................ 363/41; 363/19; 363/21; 363/23; 363/26; 323/20
[58] Field of Search ............ 363/15, 19, 21, 23, 363/25–26, 39–41, 76–79, 101; 323/17, 19–20

[56] References Cited

U.S. PATENT DOCUMENTS

| | | | |
|---|---|---|---|
| 3,611,105 | 10/1971 | Sautel et al. | 363/21 |
| 3,636,298 | 1/1972 | Risberg et al. | 323/20 X |
| 3,670,230 | 6/1972 | Rooney et al. | 363/46 |
| 3,675,115 | 7/1972 | O'Loughlin | 363/21 X |
| 4,087,850 | 5/1978 | Koizumi | 363/21 |
| 4,126,891 | 11/1978 | Suzuki et al. | 363/26 |

*Primary Examiner*—William M. Shoop
*Assistant Examiner*—Peter S. Wong
*Attorney, Agent, or Firm*—Sughrue, Rothwell, Mion, Zinn and Macpeak

[57] ABSTRACT

A regulated DC to DC power supply which minimizes input bus current changes caused by low frequency cyclical load variations is disclosed. The power supply includes a regulator connected to the input bus and controlled by a pulse width modulator. The regulator converts the DC voltage on the input bus to a higher, regulated DC voltage which is supplied to a variable load. A voltage feedback circuit is connected to the output of the boost converter and generates a control voltage which is supplied to the pulse width modulator to regulate the output voltage for variations in line voltage and load. The voltage feedback circuit includes an operational amplifier having a reference voltage supplied to a positive input terminal, and the output of the regulator supplied to a negative input terminal. A frequency response shaping network is connected between the output and the negative input terminal of the operational amplifier. An input bus current-sensing servo circuit is connected to sense current variations in the input bus and generate a control signal to the pulse width modulator to regulate the input current of the regulator. The input bus current-sensing servo circuit also includes an operational amplifier and an RC frequency response shaping network. The two frequency response shaping networks are designed such that, for a variable load which exhibits a given low frequency cyclical power change, the voltage feedback circuit generates a control signal for voltage variations below the given low frequency, but the input bus current-sensing servo circuit generates a control signal for changes having a predetermined frequency range including the given low frequency.

5 Claims, 5 Drawing Figures

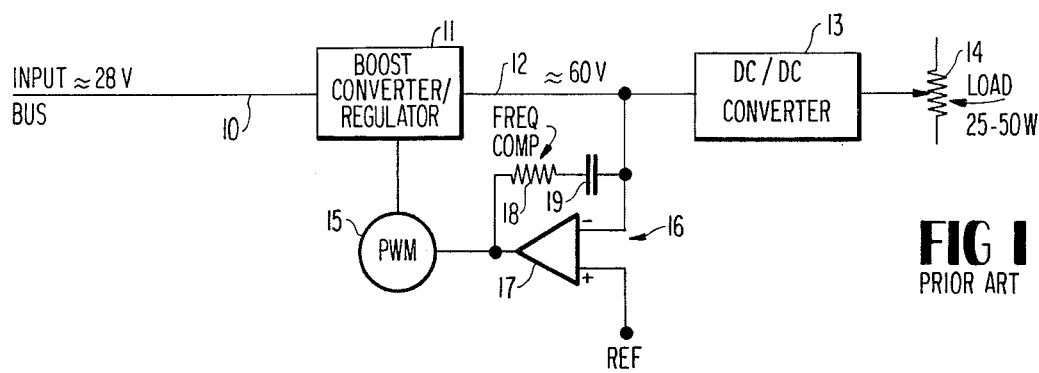
FIG 1 PRIOR ART
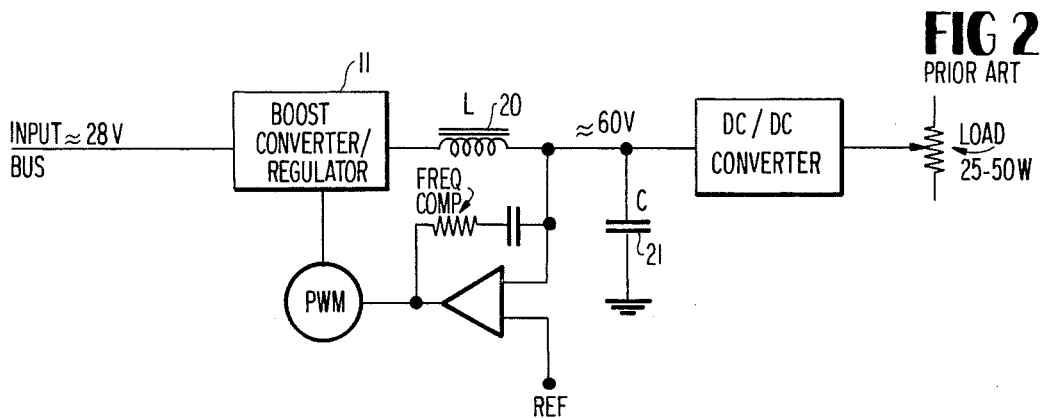
FIG 2 PRIOR ART
FIG 3
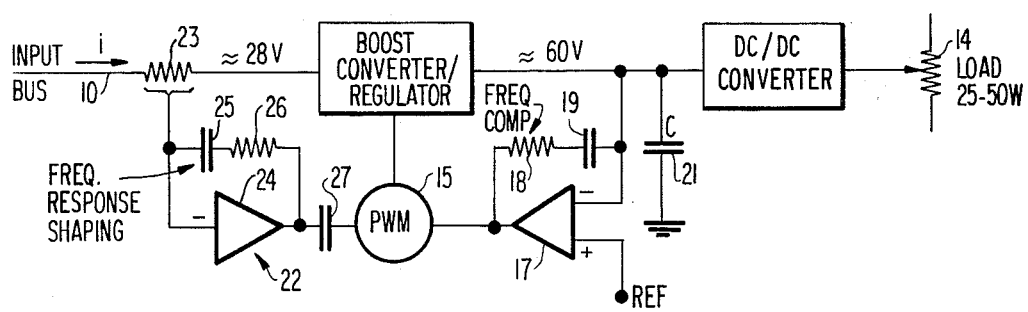
FIG 3A    FIG 3B

ACTIVE FILTER CIRCUIT FOR REGULATED DC TO DC POWER SUPPLIES

BACKGROUND OF THE INVENTION

The present invention generally relates to DC to DC regulated power supplies, and, more particularly, to improvements in such power supplies, including an active filter circuit for isolating the input power bus from reflected power changes from a variable load which exhibits a low frequency cyclical power change. The invention is especially useful in high efficiency power supplies for satellite-carried transmitters using multiple collector traveling wave tubes (TWTs) operating under widely varying modulation conditions which impose widely varying DC load requirements on the satellite power supplies. These conditions are usually encountered when a multiple collector TWT is modulated by a pulse-coded modulation with a partially filled frame and relatively slow frame rate, an example of which is time division multiple access (TDMA) modulation. At low modulation rates, the power conditioner connected between the DC input bus and the TWT appears transparent passing these power changes through to its input—namely, the satellite bus—producing an undesirable DC ripple which could effect other satellite systems.

One solution is to simply add capacitance across the collector outputs of the power supply to ground and reduce the response of the supply's regulation loop below the lowest expected frequency; however, this solution is insufficient to correct the problem because of the inherent self-regulation of the power supply which allows the current changes due to the modulation of the TWT to be reflected back into the satellite bus. The obvious answer is to place an inductor in series with the satellite bus or regulator output to form a choke-input LC filter with the added capacitance, but the weight of an inductor and capacitor, which would be effective at low frequencies, imposes a serious weight penalty.

SUMMARY OF THE INVENTION

It is therefore an object of this invention to provide a power supply which absorbs load power variations, thereby isolating the input power bus from these power changes.

It is a further object of the invention to provide an active filter circuit for a regulated DC to DC power supply which eliminates the low frequency inductor and its weight and minimizes the input power bus current ripple.

These and other objects of the invention are achieved by forcing the power supply regulator to function in a constant current mode in the worst-case load variation frequency, thereby imitating the effect of a large filter inductor, while simultaneously providing a low DC impedance to insure tight DC voltage regulation. The regulator consists of a constant current regulation servo loop with a bandpass-shaped frequency response curve having low frequency and high frequency roll-offs located below and above the expected load frequency. The power source bus feeding the regulator input is monitored for electric current level, and any current variations, such as ripple, are coupled into the constant current loop and thereby control the regulator in such a way as to minimize these variations. The voltage regulation loop is modified by changing its frequency response determining components such that its effective gain drops below unity at a frequency lower than the range of frequencies where the current loop has effective gain. In this way, the two loops operate independently without interference.

BRIEF DESCRIPTION OF THE DRAWINGS

The invention will be better understood from the following detailed description with reference to the accompanying drawings, in which:

FIG. 1 is a block diagram of a conventional power supply and regulator employing a voltage regulation loop;

FIG. 2 is a block diagram of the conventional power supply and regulator illustrated in FIG. 1 with the addition of a choke-input LC filter sized to attenuate the low frequency signal connected to the output of the regulator;

FIG. 3 is a block diagram of the power supply and regulator with the addition of the constant current regulation servo loop according to the present invention; and FIGS. 3A and 3B are graphs illustrating the frequency response characteristics of the current servo loop and the voltage regulation loop, respectively.

DETAILED DESCRIPTION OF THE INVENTION

The invention will be described in terms of a preferred embodiment as applied to a specific application. That specific application is in the power supply for satellite-carried transmitters using multiple collector TWTs which are typically modulated by a TDMA modulation exhibiting a relatively slow frame rate. In this application, the invention takes the form of a push-/pull, add-on boost regulator. However, it is to be expressly understood that the invention is not limited to this specific application or embodiment. Those skilled in the art will recognize that the invention can be used with any type of regulator, such as series, boost, buck or buck/boost.

Referring now to the drawings, and, more particularly, to FIG. 1, an input DC power bus 10 is connected to a boost converter and regulator 11. As a specific example, the input power bus may supply approximately 28 VDC to the boost converter and regulator 11 which provides an output on the output bus 12 of approximately 60 VDC. As will be explained in more detail hereinafter, the voltage on the output power bus 12 is regulated to compensate for variations in load and line voltage. In the specific application of the subject invention—i.e., TWT power supply—the output power bus 12 is connected to a DC to DC converter 13 which converts the approximately 60 VDC input to several kilovolts as required for the load 14, for example, multiple collector TWTs.

The DC to DC converter 13 is of conventional design. The boost converter and regulator 11 is also of conventional design and construction. In some applications where very high output voltages are not required, it may be possible to eliminate the DC to DC converter 13 altogether. Regulation is achieved by controlling the conduction times of switching transistors in the boost converter and regulator 11. This is conventionally accomplished with a pulse width modulator 15 which controls the conduction times of the switching transistors. Of course, if a series regulator is used, the pulse width modulator becomes unnecessary.

The pulse width modulator 15 is controlled by a voltage feedback loop 16 comprising an operational amplifier 17 having positive and negative inputs. A source of reference voltage is connected to the positive input, while the negative input is connected to the output power bus 12. A frequency response shaping network comprising a resistor 18 and a capacitor 19 connected in series is connected between the output of the operational amplifier 17 and its negative input. The pulse width modulator 15 may itself be comprised of an operational amplifier having positive and negative inputs, with the negative input being connected to the output of operational amplifier 17. A sawtooth waveform voltage is supplied to the positive input so that the output of operational amplifier 17 establishes the bias level of the sawtooth waveform voltage. A switching transistor is then controlled to be conductive only during the time when the sawtooth waveform voltage exceeds the bias level established by the output of the operational amplifier 17.

The voltage regulated power supply illustrated in FIG. 1 provides the basic high voltage requirements of a TWT. In the specific application to satellites, an effort has been made to reduce satellite weight by improving transmitter efficiency—i.e., microwave power transmitted versus DC power input. Multiple collector TWTs reduce power supply load during periods of no modulation. Also used are modulation forms like TDMA which, when used with these TWTs, produce instantaneous variations in the power levels which the power supply must handle. For example, in a dual collector TWT, the current variation of the first collector may be on the order of 1-23 mA, while the current variation of the second collector may be on the order of 36-14 mA. In other words, the power variation of the load 14 is between 25-50 watts. When these power changes occur at a low frame of repetition rate, the power variations are reflected back to the power supply to cause a substantial current ripple on the input bus 10.

FIG. 2 shows one way in which these current ripples can be absorbed. Specifically, a low-pass LC filter comprising inductor 20 and capacitor 21 is connected to the output of the boost converter and regulator 11. However, relatively slow frame rates of 50 Hz are typically encountered in TDMA modulation. At these low frequencies, the physical size and weight of the required inductor and capacitor become quite large.

Most switching regulator circuits have an LC output filter to integrate the pulse width modulated signal to a low ripple DC. These components are to be distinguished, however, from the LC filter 20, 21 since the regulator output filter components are relatively small in that they are designed to alternate frequencies $\geq 10$ KHz. Of course, in a practical embodiment, the components of the two filters may be combined in a single filter.

FIG. 3 shows the addition of a constant current regulation servo loop 22 according to the present invention. This servo loop includes a current-sensing means 23, which is typically a small resistance inserted in series in the input bus 10. The output of the current-sensing means 23 is connected to the input of an inverting operational amplifier 24. A frequency compensation network comprises a capacitor 25 and a resistor 26 connected in series between the input and output of the operational amplifier 24, and the output of the operational amplifier 24 is AC coupled by means of capacitor 27 to the control input of the pulse width modulator 15.

It should be noted that although two control inputs are shown for the pulse width modulator 15 in FIG. 3, those skilled in the art will understand that the output from the operational amplifier 17 and the AC coupled output from the operational amplifier 24 are summed at the control input of the pulse width modulator 15. The frequency response curve of the constant current regulation servo loop 22 is principally determined by the values of the capacitor 25, the resistor 26 and the capacitor 27. This frequency response curve is illustrated in FIG. 3A, and has a bandpass characteristic having low frequency and high frequency roll-offs located below and above the expected load cycle frequency. More specifically, capacitor 27 determines the low frequency roll-off, while capacitor 25 and resistor 26 determine the high frequency roll-off. Also, the frequency response curve of the voltage regulation loop is modified by changing its frequency response determining components such that its effective gain drops below unity at a frequency lower than the range of the frequencies where the current servo loop 22 has effective gain. This frequency response characteristic is shown in FIG. 3B, and the roll-off frequency is controlled by suitably choosing the values of capacitor 19 and resistor 18.

As will be appreciated by those skilled in the art, the constant current regulation servo loop 22 imitates the constant current source characteristics of the large inductor 20 without the attendant disadvantage of the weight of the inductor. Thus, the constant current regulation servo loop forms an active filter for the elimination of current ripple on the input DC bus 10 due to the power changes which occur at the load 14.

What is claimed is:

1. In a regulated DC to DC power supply of the type having an input bus for supplying a first predetermined DC voltage, regulator means connected to said input bus for converting said first predetermined DC voltage to a second predetermined DC voltage at an output of said regulator means, voltage feedback means connected to said output for generating a control signal to said regulator means which regulates said second predetermined DC voltage for changes having a first predetermined frequency range, and means for connecting said output to a variable load which exhibits a low frequency cyclical power change, the improvement comprising an input bus current-sensing servo means for generating a control signal to said regulator means which regulates the input current to said regulator means, thereby regulating said second DC voltage for changes having a second predetermined frequency range, said low frequency being above said first predetermined frequency range but within said second predetermined frequency range.

2. The regulated DC to DC power supply recited in claim 1 wherein said voltage feedback means comprises an operational amplifier having an output and positive and negative inputs, said positive input being connected to a source of reference voltage, said negative input being connected to said output of said regulator means, and an RC frequency compensation network connected between said output of said operational amplifier and said negative input, said RC frequency compensation network having a relatively low impedance at frequencies approaching and exceeding said low frequency.

3. The regulated DC to DC power supply recited in claim 1 wherein said input bus current-sensing servo means comprises current-sensing means connected to said input bus, an operational amplifier having an output and a negative input, said negative input being connected to said current-sensing means, and an RC frequency compensation network connected between said output of said operational amplifier and said negative input and between said output of said operational amplifier and said regulator means, that portion of said RC frequency compensation network connected between said operational amplifier output and said regulator means having a relatively high impedance at frequencies below said low frequency and that portion of said RC frequency compensation network connected between said output of said operational amplifier and said negative input having a relatively low impedance at frequencies above said low frequency.

4. The regulated DC to DC power supply recited in claim 1 wherein said voltage feedback means comprises a first operational amplifier having an output and positive and negative inputs, said positive input being connected to a source of reference voltage, said negative input being connected to said output of said regulator means, and a first RC frequency compensation network connected between said output of said first operational amplifier and said negative input, said first RC frequency compensation network having a relatively low impedance at frequencies approaching and exceeding said low frequency, and wherein said input bus current-sensing servo means comprises current-sensing means connected to said input bus, a second operational amplifier having an output and a negative input, said negative input being connected to said current-sensing means, and a second RC frequency compensation network connected between said output of said second operational amplifier and said negative input and between said output of said second operational amplifier and said regulator means, that portion of said RC frequency compensation network connected between said second operational amplifier output and said regulator means having a relatively high impedance at frequencies below said low frequency, and that portion of said RC frequency compensation network connected between said output of said second operational amplifier and said negative input having a relatively low impedance at frequencies above said low frequency, said voltage feedback means and said input bus current-sensing servo means being operative at different frequencies, thereby operating independently and without interference.

5. The regulated DC to DC power supply recited in claim 4 further comprising a capacitor connected across the output of said regulator means.

* * * * *